United States Patent [19]

Eisenhard

[11] 4,317,740
[45] Mar. 2, 1982

[54] WATER-SOLUBLE POLYESTERS

[75] Inventor: Wilmer C. Eisenhard, Savannah, Ga.

[73] Assignee: Union Camp Corporation, Wayne, N.J.

[21] Appl. No.: 142,647

[22] Filed: Apr. 22, 1980

[51] Int. Cl.$^3$ .......................... C10M 3/04; C10M 3/20
[52] U.S. Cl. ................................ 252/49.3; 252/52 A; 252/56 D; 252/79; 260/404.8; 252/56 S
[58] Field of Search ................ 252/49.3, 52 A, 56 D, 252/56 S, 79; 260/404.8

[56] References Cited

U.S. PATENT DOCUMENTS

| | | | |
|---|---|---|---|
| 2,188,885 | 1/1940 | Clocker | 260/404.8 X |
| 2,188,887 | 1/1940 | Clocker | 260/404.8 X |
| 2,423,364 | 7/1947 | Blair, Jr. et al. | 260/404.8 X |
| 2,444,328 | 6/1948 | Blair, Jr. | 252/56 D |
| 2,615,845 | 10/1952 | Lippincott et al. | 252/56 D |
| 2,630,441 | 3/1953 | Dazzi | 260/404.8 |
| 2,661,359 | 12/1953 | Dazzi | 260/404.8 |
| 2,839,550 | 6/1958 | Wiggerink et al. | 260/404.8 |
| 2,865,931 | 12/1958 | Mack et al. | 260/404.8 X |
| 2,975,133 | 3/1961 | Gottshall et al. | 252/34 |
| 3,006,849 | 10/1961 | Plemich | 252/49.3 X |
| 3,141,897 | 7/1964 | Crecelius et al. | 260/404.8 |
| 3,639,650 | 2/1972 | Cummings | 260/404.8 X |
| 3,708,522 | 1/1973 | LeSuer | 252/56 S X |
| 3,769,215 | 10/1973 | Sturwold et al. | 252/56 S X |
| 3,778,418 | 12/1973 | Nakayama | 260/404.8 X |

*Primary Examiner*—Andrew Metz
*Attorney, Agent, or Firm*—Kane, Dalsimer, Kane, Sullivan and Kurucz

[57] ABSTRACT

Water-soluble polyesters formed by the condensation of polyoxyalkylene glycol with the addition product of a dimer fatty acid and maleic anhydride are found to be particularly useful as lubricants and as viscosity adjusting additives in aqueous hydraulic systems.

6 Claims, No Drawings

WATER-SOLUBLE POLYESTERS

BACKGROUND OF THE INVENTION

1. Field of the Invention

The invention relates to polymeric polyesters and more particularly relates to water-soluble polymeric polyesters which are the condensation product of a polyoxyalkylene glycol and the addition product of a dimer fatty acid and maleic anhydride.

2. Brief Description of the Prior Art

In view of rapidly changing environmental, governmental and handling considerations and the growing shortage of petroleum base supplies, water-soluble lubricant products are gaining importance to the economy of the United States. Representative of prior art descriptions of water-soluble lubricant products is the description found in U.S. Pat. No. 3,769,215. In general, water-soluble lubricant products heretofore available have not been entirely satisfactory in all respects. For example, when employed in aqueous hydraulic systems, relatively high viscosity enhancement may not be achieved as desired.

The polyester compositions of the present invention exhibit a substantial thickening effect on the water in aqueous hydraulic systems when added thereto, providing the aqueous system with a higher viscosity with enhanced shear stability. Viscosities can be obtained in aqueous hydraulic systems employing the polyesters of the present invention as additives, approaching the viscosities of oil based hydraulic systems, i.e.; 40–80 cSt, at 38° Centigrade.

SUMMARY OF THE INVENTION

The invention comprises a water-soluble polyester, which comprises the condensation product of
(a) a polyoxyalkylene glycol having a molecular weight of from about 400 to about 1000; and
(b) the addition product of
(1) a dimer fatty acid; and
(2) from about 0.4 to about 0.8 equivalents of maleic anhydride for each equivalent of the dimer fatty acid.

The polyesters of the invention are useful as textile and yarn lubricants, metalworking lubricants, and particularly useful as a lubricant and viscosity enhancing additive in aqueous hydraulic systems. The polyesters of the invention are derived from dimer acids which have been maleinized with maleic anhydride and condensed with polyoxyalkylene glycols. The polyesters are water-soluble and have inverse-solubility temperature characteristics. It will be appreciated by those skilled in the art that the ability of these polyester compositions to provide complete water-solubility along with excellent lubricity is of significant importance. In addition, the water thickening or viscosity enhancing effect observed when solubilizing these polyesters in water is highly useful in aqueous hydraulic systems. The viscosity enhancing effect observed with the polyester compositions of the invention is far greater than the sum of the individual component viscosities. For example, a 7.5 percent by weight addition of polyesters of the composition to water, increases the viscosity of the water from 100 to 500 times. A 10 percent solution of polyester compositions of the invention in water increases the viscosity from 1300 to 3500 times at 25° Centigrade.

DETAILED DESCRIPTION OF THE INVENTION

Polymeric polyesters of the invention may be prepared by condensing polyoxyalkylene glycols with a very particular addition product of maleic anhydride and a dimer fatty acid.

The polyoxyalkylene glycol reactants employed in the above described condensation reaction may be characterized in part by a molecular weight within the range of from about 400 to about 1,000. The preferred polyoxyalkylene glycols employed to prepare the polymeric polyesters of the invention are those of the formula:

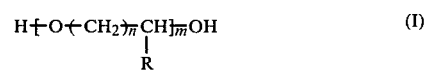

wherein R is selected from hydrogen and methyl; n represents an integer of 1 to 3 and m is such that the polymer of Formula I has a molecular weight of about 400 to about 1,000. Representative of polyoxyalkylene glycols of the Formula I are polyethylene glycols, 1,2-polypropylene glycols, 1,3-polypropylene glycols, polybutylene glycols, poly(ethylenepropylene) glycols and the like. Polyethylene glycols having molecular weights from 400 to about 1,000 are particularly preferred and are commercially available. The preparation of the preferred polyethylene glycols is also well known to those skilled in the art.

The molecular weights described above for polyoxyalkylene glycols are average molecular weights for the glycol composition. Those skilled in the art understand that these compositions are mixtures of polyoxyalkylene glycols having widely divergent molecular weights within the composition itself.

The condensation of the polyoxyalkylene glycol with the maleinized dimer fatty acid may be carried out employing conventional condensation techniques, that is for example by heating the reaction mixture of maleinized dimer fatty acid and polyoxyalkylene glycol with or without a catalyst at a temperature of from about 100° to about 300° Centigrade. The condensation is advantageously carried out while simultaneously removing the water of reaction. Preferably, the condensation reaction is carried out at a temperature range of from about 175° to about 250° Centigrade.

It is not essential that a condensation catalyst be employed for the condensation reaction. However, conventional acid catalysts such as sulfuric acid, p-toluene sulfonic acid, phosphoric acids and the like may be employed in catalytic proportions to promote the condensation reaction.

The condensation reaction may also be carried out in the presence of a diluent which is inert to the reaction conditions employed and which, preferably, will form an azeotrope with water to facilitate the removal of the water of condensation.

The proportion of reactants employed in the condensation reaction are of some importance. Advantageously, from about 2.1 to about 3.2 equivalents of polyoxyalkylene glycol are employed for each equivalent of the maleinized dimer fatty acid.

It is advantageous to carry out the condensation reaction between the maleinized dimer fatty acid and the polyoxyalkylene glycol until at least 70 percent of the carboxyl groups on the maleinized dimer fatty acid have been reacted with the polyoxyalkylene glycols.

Progress of the reaction may be followed by monitoring the acid value or hydroxyl value of the reaction mixture or alternatively by measuring the amount of water of condensation evolved.

When the condensation reaction has progressed to a desired point of completion, the reaction mixture may be allowed to cool to ambient temperatures and the desired polyester compositions separated from the reaction mixture by conventional techniques such as by stripping inert diluents, distillation and like separatory techniques.

Maleinized fatty acids are generally well known reactant compositions as is the method of their preparation. They and their dimer cousins are the adduct compositions obtained by the reactive addition of maleic anhydride to the unsaturated fatty acid. The technique of maleinization is generally well known; see for example the technique described in U.S. Pat. No. 3,753,968.

In general, maleinization of the dimer fatty acid may be carried out by simply admixing the dimer fatty acid and the maleic anhydride together and heating to a temperature within the range of from about 100° to about 300° Centigrade. The proportion of dimer fatty acid and maleic anhydride employed in the maleinization of the dimer fatty acid is critical to the preparation of water-soluble polyester compositions of the invention. For each equivalent weight of dimer fatty acid employed in the maleinization reaction, from about 0.4 to about 0.8 equivalents; preferably 0.6 equivalents of maleic anhydride are employed.

Maleic anhydride is of course a well known chemical compound as is its method of preparation. Dimer fatty acids are also a well known class of polymer fatty acids as is the method of their preparation. Representative of dimer fatty acids are those which contain 32 to 54 carbon atoms. The latter dimer fatty acids may be prepared by the polymerization of monocarboxylic acids containing ethylenic unsaturation. The monocarboxylic unsaturated acids generally contain from about 16 to 26 carbon atoms and include, for example, oleic acid, linoleic acid, eleostearic acid and the like. Mixtures of dimer acids may also be employed. Trimer and tetramer acids may also be present with the dimer acid and generally do not adversely affect the lubricant properties of the resulting polyester compositions as long as about 50 percent by weight of the dimer acid composition are dimeric in nature. Commercially available dimer fatty acid compositions may be obtained freely in the marketplace.

The polyester compositions of the present invention are useful in aqueous solutions or emulsions as lubricants for metalworking operations. When so used, the concentration of the polyester employed in the aqueous emulsion will generally range from about 0.1 to about 25 percent by weight of the lubricant composition although other proportions may be employed. The aqueous emulsions of the polyester compositions of the invention are added to the metalworking elements such as the metal itself by spraying or with other similar equipment. When so applied, the polyester compositions of the invention provide a continuous and uniform lubricant film between metal parts. These lubricants are useful for working both ferrous and nonferrous metals. They may also be formulated with other additives such as stabilizers, corrosion inhibitors and the like.

The following examples describe the manner and process of making and using the invention and set forth the best mode contemplated by the inventor of carrying out the invention but are not to be construed as limiting.

A Falex machine was employed to evaluate the compositions of the invention prepared in the following examples. The Falex machine provides a convenient and reliable means to determine the film strength or load-carrying properties of materials as extreme pressures are applied. The Falex wear test (ASTM-D-2670-67) was employed.

EXAMPLE I

A glass reactor equipped with a stirrer, thermometer and condenser is charged with 1000 gms (37.1%; 3.4 eq.) of dimer fatty acid (Unidyme 18; Union Camp Corporation, containing 83% by weight dimer acid) and 100 gms of maleic anhydride (3.7% by weight; 2.04 eq.). The charge is heated at a temperature of 220° C. until the reaction mixture has a viscosity of 180 to 215 cSt at 100° C. A water trap is attached to the reactor and 1595 gms (59.2% by weight; 8 eq.) of polyethylene glycol with an average molecular weight of 400 (Carbowax 400; Union Carbide Corporation) is added with stirring. The resulting mixture is heated to a maximum temperature of 225° C. until the acid value is at least 12 and the viscosity is in the 380–420 cSt range (100° C.). At the end of this period, the reaction mixture is allowed to cool to a temperature of 125° C. and then poured off. A representative portion of the resulting polyester composition is subjected to physical analysis and shows an acid value (mg KOH/g) of 11.5, a viscosity at 100° C. of 210 cSt, a hydroxyl value (mg KOH/g) of 75, a specific gravity at 25° C. of 1.065, a flash point (C.O.C.) of 300° C. and a fire point of 335° C. A 7.5% aqueous solution of the polyester composition in tap water (pH 7.8, 90 ppm hardness) is a clear, homogeneous solution having a viscosity of 475 cSt at 38° C. The solution remains clear and homogeneous for several weeks at room temperature.

The polyester composition prepared in Example I above, was evaluated with a Falex machine. A load of 250 lbs was applied to the pins via contacting steel blocks for five minutes, the pins being totally immersed in a 5% aqueous, clear solution of the polyester composition of Example I. After five minutes a load of 500 lbs was applied and the degree of wear or units of wear (teeth) were noted every fifteen minutes for one hour at an applied load of 500 lbs. The total units of wear were 152 after one hour and the pin was worn smooth without galling or welding taking place.

EXAMPLE II

The procedure of Example I was repeated except that the Unidyme 18, maleic anhydride and polyethylene glycol were all charged to the reactor at the same time and a random polymerization carried out. The 7.5% aqueous solution prepared from the resulting polyester composition shows phase separation after standing for 24 hours at room temperature.

EXAMPLE III

The procedure of Example I is repeated except that the proportion of dimer acid is reduced to 80 gms (1.63 eq.) and the maleinization is carried out until a viscosity of 100 cSt at 100° C. is obtained. The maleinized dimer fatty acid is then further reacted with 1565 gms (7.8 eq.) of the polyoxyethylene glycol. The resulting polyester has only partial water-solubility.

EXAMPLE IV

The procedure of Example I is repeated except that the proportion of maleic anhydride is reduced to 50 gms (1.02 eq.) and 1565 gms (7.8 eq.) of the polyoxyethylene glycol is employed. The resulting polyester composition has poor water-solubility and provided an unstable emulsion.

EXAMPLE V

The procedure of Example I above is repeated, except that 1430 gms (7.2 eq.) of the polyoxyethylene glycol was employed. The resulting polyester composition is water-soluble and forms clear, homogeneous water emulsions upon addition of 10% of the polyester to tap water. The 10% solution shows a viscosity at 38° C. of 1725 cSt.

EXAMPLE VI

Repeating the procedure of Example I, above, but employing 1810 gms (9.1 eq.) of the polyoxyethylene glycol, a polyester composition is obtained having excellent water-solubility. When a 10% aqueous solution of the polyester is prepared, it exhibits clear, homogeneous emulsion properties with a viscosity at 38° C. of 253 cSt.

EXAMPLE VII

Following the procedure of Example I above, but employing 2200 gms (11 eq.) of the polyoxyethylene glycol, there is obtained a water-soluble polyester composition. When a 10% aqueous solution of the polyester is prepared, it exhibits homogeneous, clear characteristics and a viscosity of 7 cSt at a temperature of 38° C. The modified Falex wear test (ASTM D-2670-67) using a 5% solution with a break-in period of five minutes at 250 lbs and then applying a load of 500 lbs showed 152 units of wear (teeth). The pin was worn smooth without any galling.

EXAMPLE VIII

Following the procedure of Example I, but maleinizing 292 gms (1.0 eq.) of the Unidyme 18 with 29 gms (0.6 eq.) of the maleic anhydride to a viscosity of 190 cSt (at 99° C.) and reacting the maleinate with 1160 gms of the polyoxyethylene glycol (2.3 eq.) there is obtained a polyester composition with a final acid value of 7.8 and a viscosity of 165 cSt at 99° C. On diluting with tap water at a 10% concentration, a clear, homogeneous solution results with a viscosity of 3 cSt at 38° C.

EXAMPLE IX

Repeating the procedure of Example VIII but replacing the polyoxyethylene glycol as employed therein with 465 gms (3.1 eq.) of a polyethylene glycol having a molecular weight of 300 resulted in a polyester composition having an acid value of 8.9 and a viscosity of 87 cSt at 99° C. A 10% addition in tap water results in a translucent solution but the solution exhibits separation after standing for two weeks at a temperature of 25° C.

EXAMPLE X

Repeating the procedure of Example I, supra., but replacing the polyoxyethylene glycol as used therein with an equal proportion of a polyoxypropylene glycol having a molecular weight of 400 to 1000, water-soluble polyesters of the invention are obtained.

The Examples II, III, IV and X given above are not Examples of the invention but are given for purposes of comparison. In the Example II it is shown that a physical mixture of dimer acid and maleic anhydride reacted with polyethylene glycol 400 does not result in water-soluble systems, but rather unstable emulsions. More specifically, maleic anhydride reacted with the dimer acid and then the product reacted with polyoxyalkylene glycol is necessary to obtain the desired polyesters.

I claim:

1. A water-soluble polyester which comprises; the condensation product of
   (a) a polyoxyalkylene glycol having a molecular weight of from about 400 to about 1000; and
   (b) the addition product of
      (1) a dimer fatty acid; and
      (2) from about 0.4 to about 0.8 equivalents of maleic anhydride for each equivalent of the dimer fatty acid wherein about 2.1 to about 3.2 equivalents of the glycol are used for each equivalent of the addition product.
2. The polyester of claim 1 wherein said glycol is polyoxyethylene glycol.
3. The polyester of claim 1 wherein the equivalents of maleic anhydride employed is 0.6.
4. The polyester of claim 1 wherein the glycol has a molecular weight of 400.
5. From about 0.1 to 25.0 percent by weight of the polyester of claim 1 in aqueous solution.
6. The polyester of claim 1 wherein at least 70 percent of the carboxyl groups on the addition product have been reacted with the glycol.

* * * * *